US008868775B2

(12) United States Patent
Filsfils et al.

(10) Patent No.: US 8,868,775 B2
(45) Date of Patent: Oct. 21, 2014

(54) LOAD BALANCING MANIPULATION OF PACKET FLOWS WITHIN A TRANSPORT CONDUIT

(75) Inventors: Clarence Filsfils, Brussels (BE); Stewart Frederick Bryant, Merstham (GB); William Mark Townsley, Paris (FR); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 313 days.

(21) Appl. No.: 12/028,819

(22) Filed: Feb. 10, 2008

(65) Prior Publication Data

US 2009/0201811 A1 Aug. 13, 2009

(51) Int. Cl.
*G06F 15/173* (2006.01)
*H04L 1/00* (2006.01)
*H04L 12/28* (2006.01)
*H04L 12/801* (2013.01)
*H04L 12/701* (2013.01)
*H04L 12/707* (2013.01)
*H04L 12/803* (2013.01)

(52) U.S. Cl.
CPC ............... *H04L 47/10* (2013.01); *H04L 45/00* (2013.01); *H04L 45/24* (2013.01); *H04L 47/125* (2013.01)
USPC .......................... 709/232; 370/230.1; 370/389

(58) Field of Classification Search
USPC ........ 709/246, 238, 232; 370/386, 389, 230.1
See application file for complete search history.

(56) References Cited

U.S. PATENT DOCUMENTS

| 5,978,844 | A  | * | 11/1999 | Tsuchiya et al. | 709/221 |
|-----------|----|---|---------|-----------------|---------|
| 6,112,248 | A  | * | 8/2000  | Maciel et al.   | 709/238 |
| 6,182,139 | B1 | * | 1/2001  | Brendel         | 709/226 |
| 6,272,522 | B1 | * | 8/2001  | Lin et al.      | 709/200 |
| 6,374,300 | B2 | * | 4/2002  | Masters         | 709/229 |
| 6,397,252 | B1 | * | 5/2002  | Sadiq           | 709/226 |
| 6,473,403 | B1 | * | 10/2002 | Bare            | 370/236 |
| 6,473,424 | B1 | * | 10/2002 | DeJager et al.  | 370/389 |
| 6,473,802 | B2 | * | 10/2002 | Masters         | 709/229 |
| 6,490,632 | B1 | * | 12/2002 | Vepa et al.     | 709/250 |
| 6,542,504 | B1 | * | 4/2003  | Mahler et al.   | 370/392 |
| 6,813,665 | B2 | * | 11/2004 | Rankin et al.   | 710/260 |
| 6,856,991 | B1 | * | 2/2005  | Srivastava      | 1/1     |
| 6,914,964 | B1 | * | 7/2005  | Levine          | 379/52  |
| 6,963,582 | B1 | * | 11/2005 | Xu              | 370/466 |
| 6,980,521 | B1 |   | 12/2005 | Jarvis          |         |

(Continued)

OTHER PUBLICATIONS

S. Hanks, RFC 1701—Generic Routing Encapsulation, Oct. 1994, published by the Network Working Group.*

(Continued)

*Primary Examiner* — Brian P Whipple
*Assistant Examiner* — Michael A Chambers
(74) *Attorney, Agent, or Firm* — The Law Office of Kirk D. Williams (57) ABSTRACT

Disclosed are, inter alia, methods, apparatus, computer-readable media, mechanisms, and means for load balancing manipulation of packet flows within a transport conduit (e.g., a tunnel, pseudo wire, etc.), typically using a load balancing value which is independent of standard routing-based parameters (e.g., source address, destination address, source port, destination port, protocol type, etc.). A load balancing value is included in encapsulated packets transported across a network using a transport conduit. This load balancing value can be used to load balance the individual flows/microflows within the transport conduit.

22 Claims, 6 Drawing Sheets

(56) References Cited

U.S. PATENT DOCUMENTS

| | | | |
|---|---|---|---|
| 7,012,919 B1* | 3/2006 | So et al. | 370/392 |
| 7,082,477 B1* | 7/2006 | Sadhasivam et al. | 709/246 |
| 7,107,334 B1* | 9/2006 | Shaffer et al. | 709/224 |
| 7,173,932 B2* | 2/2007 | Miki et al. | 370/389 |
| 7,212,526 B2 | 5/2007 | Kanetake | |
| 7,424,533 B1* | 9/2008 | Di Benedetto et al. | 709/226 |
| 7,499,453 B2* | 3/2009 | Carlson et al. | 370/395.2 |
| 7,545,744 B2* | 6/2009 | Zeitak | 370/230.1 |
| 7,647,393 B2* | 1/2010 | Yang et al. | 709/223 |
| 7,739,384 B2* | 6/2010 | Siev et al. | 709/226 |
| 7,739,398 B1* | 6/2010 | Shabtay | 709/232 |
| 7,784,055 B2* | 8/2010 | Srivastava | 718/105 |
| 7,797,419 B2* | 9/2010 | Bhattacharya et al. | 709/224 |
| 8,145,746 B1* | 3/2012 | Singh et al. | 709/224 |
| 8,219,675 B2 | 7/2012 | Ivershen | |
| 8,244,864 B1* | 8/2012 | Bahl et al. | 709/225 |
| 2002/0087724 A1* | 7/2002 | Datta et al. | 709/241 |
| 2002/0176414 A1* | 11/2002 | Miki et al. | 370/389 |
| 2003/0137978 A1* | 7/2003 | Kanetake | 370/386 |
| 2005/0080890 A1* | 4/2005 | Yang et al. | 709/223 |
| 2005/0149531 A1* | 7/2005 | Srivastava | 707/10 |
| 2006/0250948 A1* | 11/2006 | Zamfir et al. | 370/216 |

OTHER PUBLICATIONS

Hanks—RFC 1701—Generic Routing Encapsulation (GRE)—Oct 1994.*

Townsley et al., "Encapsulation of MPLS over Layer 2 Tunneling Protocol Version 3," RFC 4817, IETF, Mar. 2007, 12 pages.

Bryant & Pate, "Pseudo Wire Emulation Edge-to-Edge (PWE3) Architecture," RFC 3985, IETF, Mar. 2005, 42 pages.

"Layer 2 Tunneling Protocol Version 3," Cisco Systems, Inc., San Jose, CA, 2003, 8 pages.

Andersson et al., "LDP Specification," Oct. 2007, RFC 5036, http://datatracker.ietf.org/doc/rfc5036, The Internet Society, Reston, VA, USA (135 pages).

* cited by examiner

EXAMPLE NETWORK
FIGURE 1

LOAD BALANCING MANIPULATION OF PACKET FLOWS WITHIN A TRANSPORT CONDUIT

TECHNICAL FIELD

The present disclosure relates generally to communications and computer systems, especially packet switching systems and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Note, nothing described or referenced in this document is admitted as prior art to this application unless explicitly so stated.

It is common for customer networks at different locations to be interconnected using tunnels or pseudo wires over a connecting network (e.g., service provider's network). For example, an edge router of this connecting network receives packets from a first network, encapsulates and transports the packets over the tunnel or pseudo wire to another edge router, which strips the encapsulation and forwards the packets onto the second network. Routers in the connecting network between the edge routers are often referred to as midpoint routers. These midpoint routers may perform load balancing in the connecting network, such as by each midpoint router selecting a next hop towards the edge router in order to distribute the load across the network but in a manner that all packets in a tunnel or pseudo wire follow the same path through the connecting network.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-readable media, mechanisms, and means for load balancing manipulation of packet flows within a transport conduit (e.g., a tunnel, pseudo wire, etc.). One embodiment uses a load balancing value independent of standard routing-based parameters (e.g., source address, destination address, source port, destination port, protocol type, etc.), which allows one embodiment to select the load balancing value to affect the transportation of traffic in a desired manner. One embodiment selects and includes a load balancing value in encapsulated packets transported across a network using the transport conduit. By using different values by different flows/microflows, these flows/microflows within the transport conduit can be load balanced. One embodiment uses a new field defined for carrying the load balancing value in the encapsulated packet. One embodiment adapts a field previously defined for the encapsulated packet by using a portion for the original semantics of the field with a different portion used for including the load balancing value. One embodiment adds the load balancing value to a Multiprotocol Label Switching (MPLS) label stack.

2. Description

Disclosed are, inter alia, methods, apparatus, computer-readable media, mechanisms, and means for load balancing manipulation of packet flows within a transport conduit (e.g., a tunnel, pseudo wire, etc.).

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads. etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x", is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-readable media, mechanisms, and means for load balancing manipulation of packet flows within a transport conduit (e.g., a tunnel, pseudo wire, etc.). One embodiment uses a load balancing value independent of standard routing-based parameters (e.g., source address, destination address, source port, destination port, protocol type, etc.), which allows one embodiment to select the load balancing value to affect the transportation of traffic in a desired manner. One embodiment selects and includes a load balancing value in encapsulated packets transported across a network using the transport conduit. By using different values by different flows/microflows, these flows/microflows within the transport conduit can be load balanced. One embodiment uses a new field defined for carrying the load balancing value in the encapsulated packet. One embodiment adapts a field previously defined for the encapsulated packet by using a portion for the original semantics of the field with a different portion used for including the load balancing value. One embodiment adds the load balancing value to a Multiprotocol Label Switching (MPLS) label stack.

One embodiment includes a packet switching device, comprising: one or more interfaces configured for sending and receiving packets; and one or more processing elements configured to: determine a transport conduit over which to forward a packet in a network; to determine a load balancing value selected to add entropy to the packet for load balancing operations performed by packet switching devices in the network providing the transport conduit; and to forward from an interface of said interfaces the packet encapsulated for transportation through the transport conduit, with said encapsulated packet including said determined load balancing value.

In one embodiment, the transport conduit comprises a tunnel; and wherein the load balancing value is selected for load balancing packet flows within the tunnel. In one embodiment, said load balancing value is inserted in a portion of a session identification field of said encapsulation of the packet. In one embodiment, wherein a portion of the session identification field not including the load balancing value identifies the session within the tunnel for the packet. In one embodiment, said tunnel is a generic routing encapsulation (GRE) tunnel, and the load balancing value is included in the Key field. In one embodiment, the transport conduit comprises a pseudo wire; and wherein the load balancing value is selected for load balancing microflows within the pseudo wire. In one embodiment, the load balancing value is added to a load balancing field of said encapsulation of the packet. In one embodiment, the load balancing value is a pseudo random number. In one embodiment, the packet switching device is configured to insert the load balancing value in a field independent of other functionality in said encapsulation of the packet. In one embodiment, the packet switching device is configured to add the load balancing value in a Multiprotocol Label Switching (MPLS) label in said encapsulation of the packet. In one embodiment, the packet switching device is configured to add the MPLS label to the bottom of a label stack including a plurality of MPLS labels in said encapsulation of the packet. In one embodiment, the packet switching device is configured to insert the load balancing value in a field for use by one or more of said packet switching devices in the network providing the transport conduit for only load balancing purposes.

One embodiment includes a method performed by a particular packet switching device, with the method comprising: determining a transport conduit over which to forward a packet to a second packet switching device in a network; determining a load balancing value designed to add entropy to the packet for load balancing operations performed by packet switching devices in the network providing the transport conduit; and forwarding the packet including said determined load balancing value over said determined transport conduit.

In one embodiment, the transport conduit is a tunnel; and wherein said operation of determining the load balancing value includes selecting the load balancing value for load balancing packet flows within the tunnel. In one embodiment, the transport conduit is a pseudo wire; and wherein said operation of determining the load balancing value includes selecting the load balancing value for load balancing microflows within the pseudo wire. In one embodiment, endpoints of the transport conduit are the particular packet switching device and the second packet switching device.

One embodiment includes an apparatus, comprising: means for determining a transport conduit over which to forward a packet to a second packet switching device in a network; means for determining a load balancing value designed to add entropy to the packet for load balancing operations performed by packet switching devices in the network providing the transport conduit; and means for forwarding the packet including said determined load balancing value over said determined transport conduit.

One embodiment includes a method for operating a first network edge packet switching device of a network, the first network edge packet switching device performing packet encapsulation for transporting packets through a transport conduit across a network to a second network edge packet switching device, with the method comprising: for each particular packet flow of a plurality of packet flows being communicated from the first network edge packet switching device to the second network edge packet switching device over the transport conduit: for each particular packet of the particular packet flow: encapsulating said particular packet according to the protocol of said transport conduit and forwarding said particular packet from the first network edge packet switching device, wherein said encapsulation of said particular packet includes a load balancing value to add entropy to load balancing performed by one or more packet switching devices along at least one of a plurality of active paths in the transport conduit; wherein the load balancing value is the same for all said packets of a same packet flow of the plurality of packet flows, and is different for at least two different packet flows of the plurality of packet flows.

In one embodiment, the load balancing value is a pseudo-random number. In one embodiment, the first network edge packet switching device inserts the load balancing value in a field independent of other functionality in said transport conduit encapsulation. In one embodiment, the first network edge packet switching device pushes a Multiprotocol Label Switching (MPLS) label including the load balancing value onto the bottom of a label stack including a plurality of MPLS labels in said transport conduit encapsulation. In one embodiment, said load balancing value is inserted in a portion of a session identification field of said transport conduit encapsulation; and wherein the first network edge packet switching device and the second network edge packet switching device use the portion of the session identification field not including the load balancing value included in each said packet as the identifier of the session within the transport conduit for each said packet.

One embodiment includes a method performed in a network, the network including a first network edge packet switching device, a second network edge packet switching device, a midpoint packet switching device, wherein the midpoint packet switching device is communicatively coupled to both the first network edge packet switching device and the second network edge packet switching device including a plurality of paths between the midpoint packet switching device and the second network edge packet switching device, with the method comprising: the first network edge packet switching device determining a load balancing value designed to add entropy in the load balancing of packet traffic in the network, and adding the load balancing value to each packet of a stream of packets in a packet flow being routed through the midpoint packet switching device and the second network edge packet switching device; the midpoint packet switching device receiving each packet of the stream of packets in the packet flow and determining which particular path of the plurality of paths between the midpoint packet switching device and the second network edge packet switching device based on the load balancing value, and sending each packet of the stream of packets; and the second network edge packet switching device striping the load balancing value from the packet, and forwarding the packet without the load balancing value to another device.

In one embodiment, each packet of the stream of packets in the packet flow is being sent through a transport conduit from the first network edge packet switching device to the second network edge packet switching device, with the first network edge packet switching device adding transport conduit encapsulation to each said packet and the second network edge packet switching device removing said transport conduit encapsulation from each said packet. In one embodiment, the load balancing value is not used by the second network edge packet switching device for any flow manipulation operation, including demultiplexing of packet traffic carried through the transport conduit. In one embodiment, the load balancing value is in a well-defined field designated for load balancing purposes.

Figure 1:
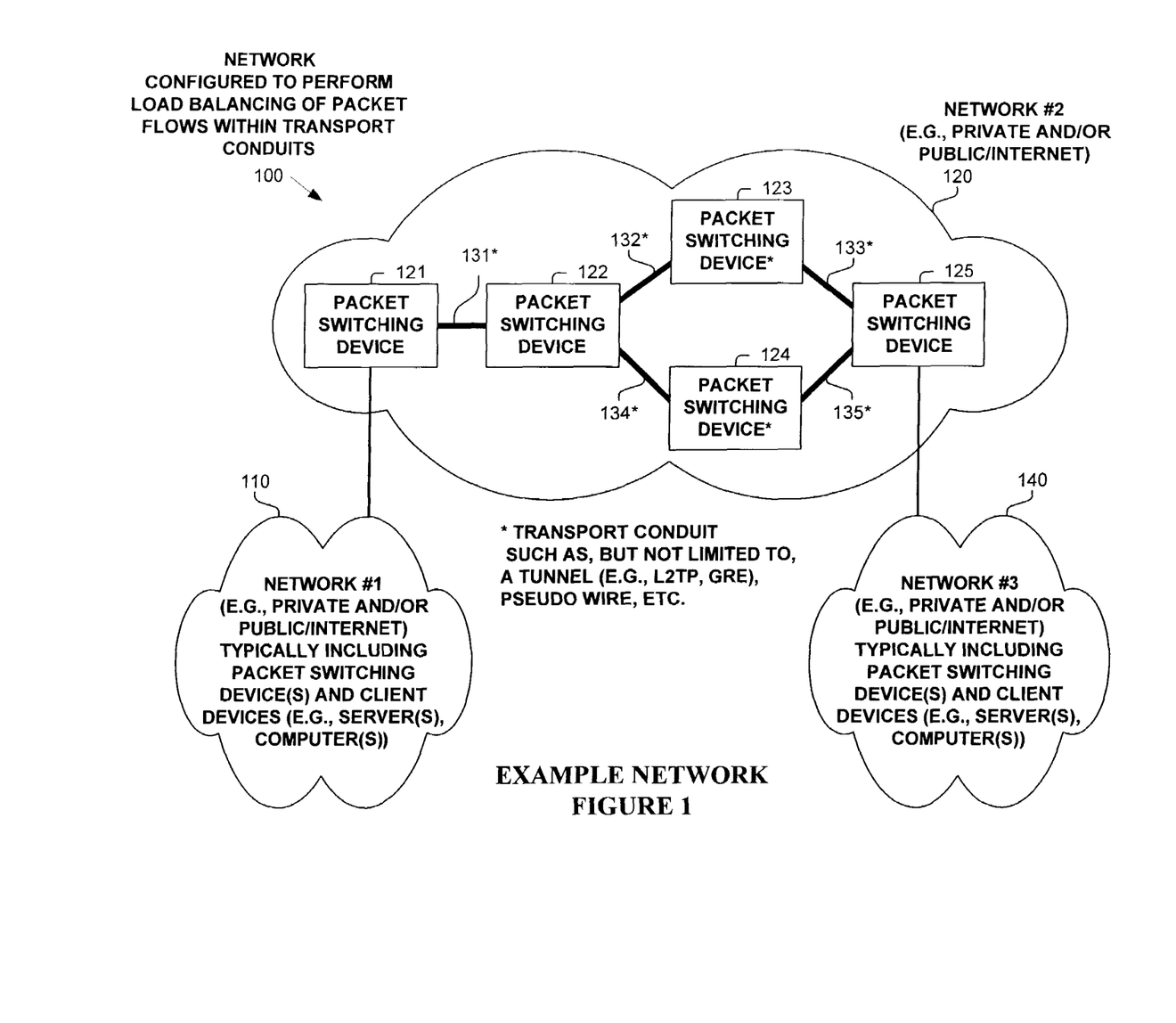
FIG. 1 illustrates an example network operating according to one embodiment.

Turning expressly to the figures, FIG. 1 illustrates an example network 100 configured to perform load balancing of packet flows within transport conduits (e.g., tunnels, pseudo wires, etc.). In this example embodiment, two networks (110, 140) are coupled using transport conduits (e.g., one in each direction) through network 120.

As shown, network 120 includes packet switching devices (e.g., bridges, routers) 121-125 coupled with communication links 131-135. The arrangement of packet switching devices 121-125 and communication links 131-135 are drawn to illustrate two paths between networks 110 and 140 for ease of explanation. FIG. 1 illustrates two edge packet switching devices 121 and 125, and three midpoint packet switching devices 122-124 coupling networks 110 and 140. Of course, embodiments include and/or are used in different network configurations.

In this example of one embodiment, a packet to be sent to network 140 using a transport conduit is received by packet switching device 121 from network 110. Packet switching device 121 classifies the packet to identify a stream of packets (e.g., a flow/microflow) to which the packet belongs, and determines a load balancing value thereon. In other words, the flows/microflows that are being transported through a transport conduit can be individual (or in subsets) load balanced rather than the entire transport conduit being load balanced, while maintaining the sequence ordering of the packets within the individual flows/microflows as received by network 140.

Figure 2A:
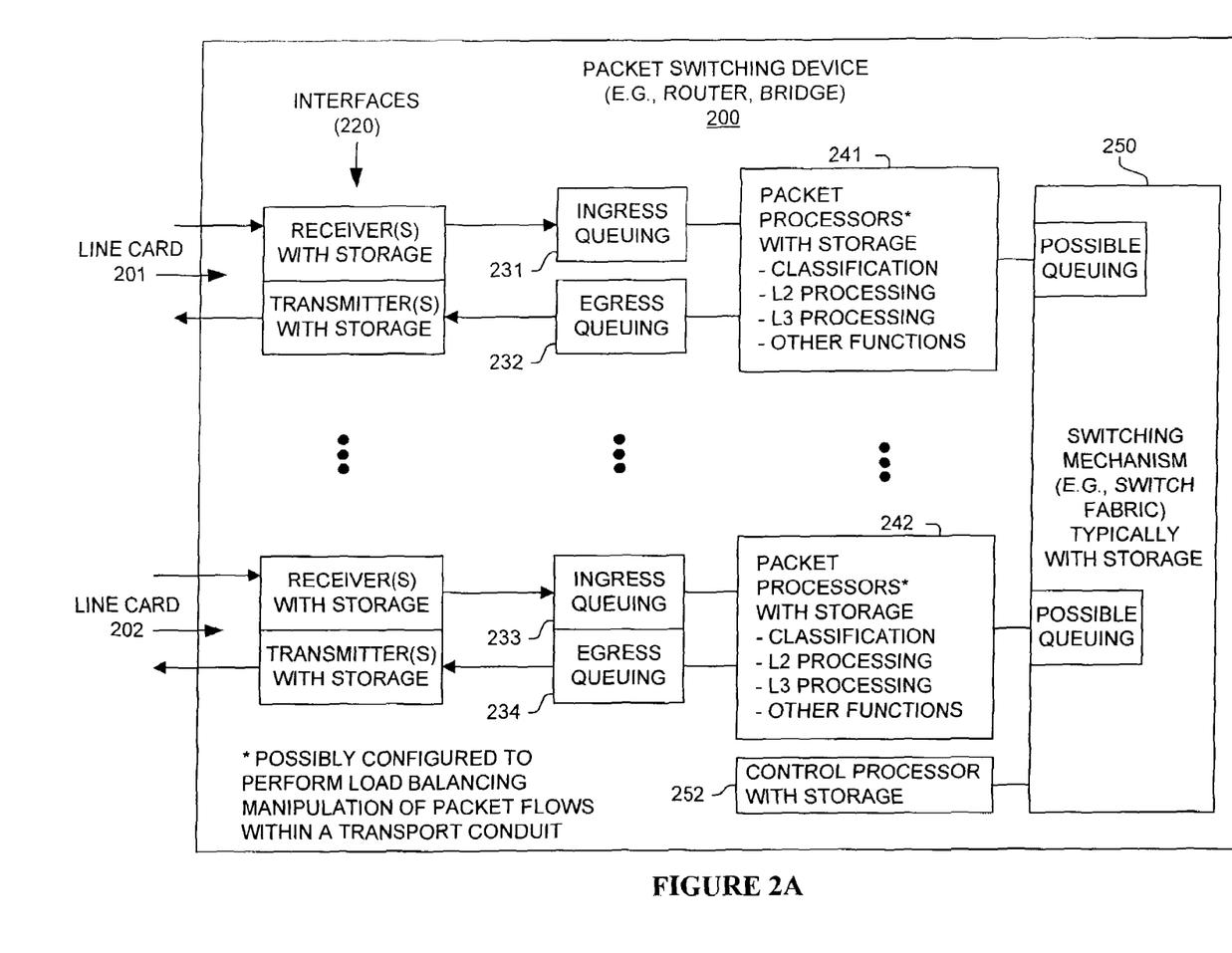
FIG. 2A illustrates a packet switching device operating according to one embodiment.

FIG. 2A illustrates an example of a packet switching device of one embodiment. As shown, packet switching device 200 (e.g., router, bridge, etc.) comprises: line cards 201-202 which include ingress and egress interfaces (220), queuing (231-234), and packet processors with storage (241-242); switching mechanism 250 (e.g., switch fabric, bus, crossbar) which may include input or output queues (or possibly these queues are located elsewhere, such as on a line cards 201-202); and control processor with storage 252. In one embodiment, one or both of packet processors 241 and 242 are configured to encapsulate packets for forwarding through a transport conduit, which may include determining a load balancing value to include in the encapsulated packet. In one embodiment, the same load balancing value is used for all packets being transported through the transport conduit. In one embodiment, packets of at least two different flows or microflows being transported through the transport conduit use different load balancing values.

Figure 2B:
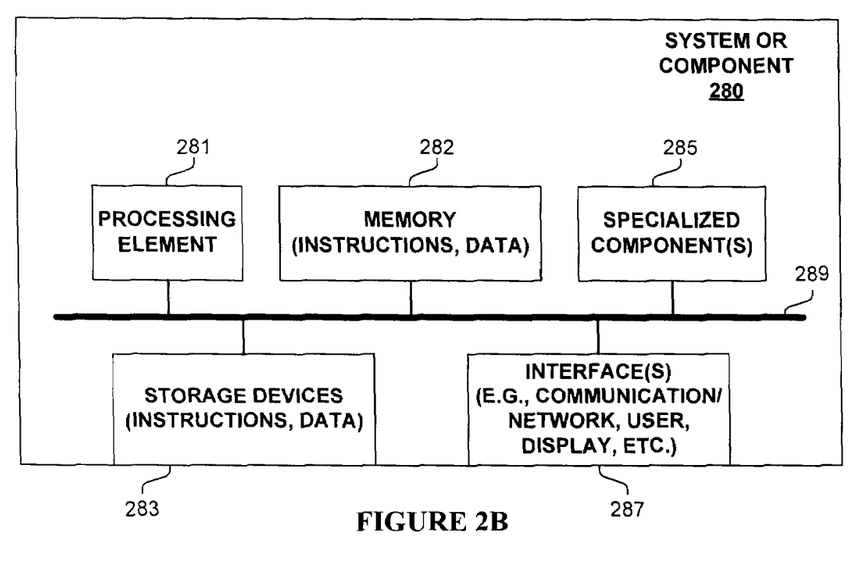
FIG. 2B illustrates an example system or component used in one embodiment.

FIG. 2B is block diagram of a system or component 280 used in one embodiment that performs load balancing of packet flows within transport conduits (e.g., tunnels, pseudo wires, etc.). In one embodiment, system or component 280 performs one or more processes corresponding to one of the flow diagrams illustrated or otherwise described herein.

In one embodiment, system or component 280 includes a processing element 281, memory 282, storage devices 283, specialized components 285 (e.g. optimized hardware such as for performing classification operations, etc.), and interface(s) 287 for communicating information (e.g., sending and receiving packets, user-interfaces, displaying information, etc.), which are typically communicatively coupled via one or more communications mechanisms 289, with the communications paths typically tailored to meet the needs of the application.

Various embodiments of component 280 may include more or less elements. The operation of component 280 is typically controlled by processing element 281 using memory 282 and storage devices 283 to perform one or more tasks or processes. Memory 282 is one type of computer-readable medium, and typically comprises random access memory (RAM), read only memory (ROM), flash memory, integrated circuits, and/or other memory components. Memory 282 typically stores computer-executable instructions to be executed by processing element 281 and/or data which is manipulated by processing element 281 for implementing functionality in accordance with an embodiment. Storage devices 283 are another type of computer-readable medium, and typically comprise solid state storage media, disk drives, diskettes, networked services, tape drives, and other storage devices. Storage devices 283 typically store computer-executable instructions to be executed by processing element 281 and/or data which is manipulated by processing element 281 for implementing functionality in accordance with an embodiment.

Figure 3A:
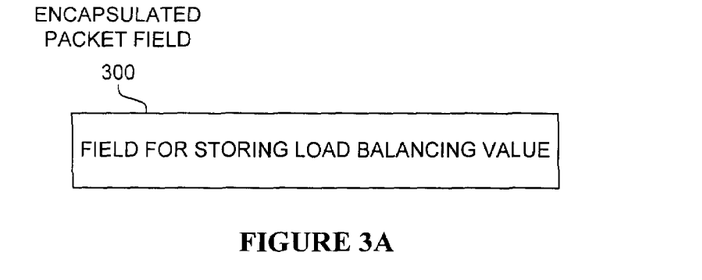
FIG. 3A illustrates the inclusion of a load balancing value in a packet according to one embodiment.

FIG. 3A illustrates the inclusion of a load balancing value (300) in a packet according to one embodiment. One embodiment includes a well-defined field which can be used by packet switching devices (e.g., midpoint packet switching devices) for use in performing load balancing operations. Note, different load balancing values can be used for packets of different flows or microflows within a transport conduit.

Figure 3B:
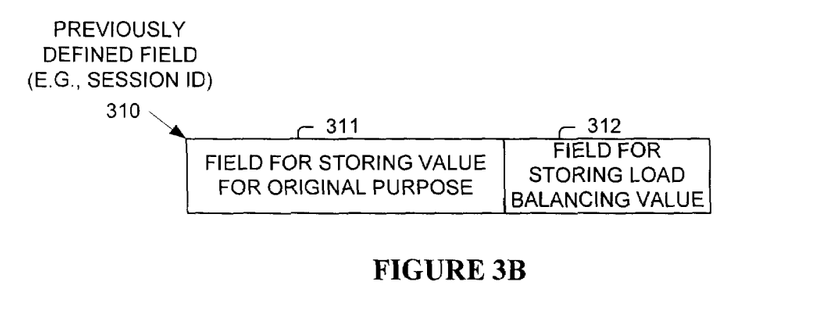
FIG. 3B illustrates the inclusion of a load balancing value in a packet according to one embodiment.

FIG. 3B illustrates the inclusion of a load balancing value (312) in a packet according to one embodiment. One embodiment adapts a previously defined field (310) for a protocol to include a field (311) for storing a value for its original purpose and a second field (312) for storing a load balancing value.

For example, a Session ID field may be originally defined as a sixteen or thirty-two bit value. If the two edge packet switching devices only use a subset of the field for the Session ID, the remaining bits can be used to contain a load balancing value. Note, it is common for midpoint packet switching devices to use the Session ID field in performing its load balancing operations. Therefore, in one configuration and embodiment, this mechanism may allow an edge packet switching device to affect the load balancing operations performed by the midpoint packet switching device without modifying the midpoint packet switching device. Moreover, different load balancing values can be used for packets of different flows or microflows within the transport conduit (and therefore these flows or microflows may take different paths through the network). Of course, one embodiment adapts and uses a field different than the Session ID.

Figure 3C:
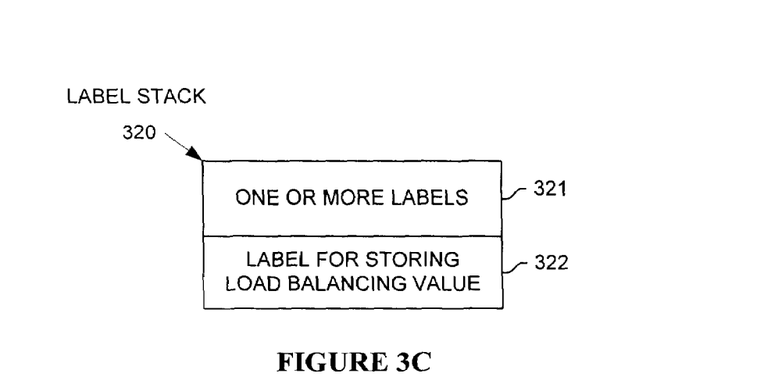
FIG. 3C illustrates the inclusion of a load balancing value in a packet according to one embodiment.

FIG. 3C illustrates the inclusion of a load balancing value in the label stack 320 of a packet according to one embodiment. In one embodiment, an edge packet switching device places a load balancing value as the bottom label 322 in the label stack, including one or more additional labels 321; and the corresponding destination edge packet switching device throws away the load balancing label 322. Note, it is common for midpoint packet switching devices to use the value of the label on the bottom of a MPLS label stack in performing its load balancing operations. Therefore, in one configuration and embodiment, this mechanism may allow an edge packet switching device to affect the load balancing operations performed by the midpoint packet switching device without modifying the midpoint packet switching device. Moreover, different load balancing values can be used for packets of different flows or microflows within the transport conduit (and therefore, these flows or microflows may take different paths through the network). Of course, one embodiment places the load balancing label in a different position in the label stack.

Additionally, one embodiment uses a portion of a predefined field, such as that described in relation to FIG. 3B, of one of its labels as the load balancing label. One embodiment uses a label or other field, or portion thereof, as the load balancing value, with this label or other field being discarded prior to forwarding of the packet. One embodiment modifies the load balancing value (in value and/or its manner of inclusion in the packet) in transit through the network, such as to affect the load balancing performed by the current packet switching device and/or other packet switching devices in the network. In one embodiment, this modification of the load balancing value occurs at a point of demarcation between transport services, such as, but not limited to, when peering between PWE3/MPLS and T-MPLS.

Figure 4A:
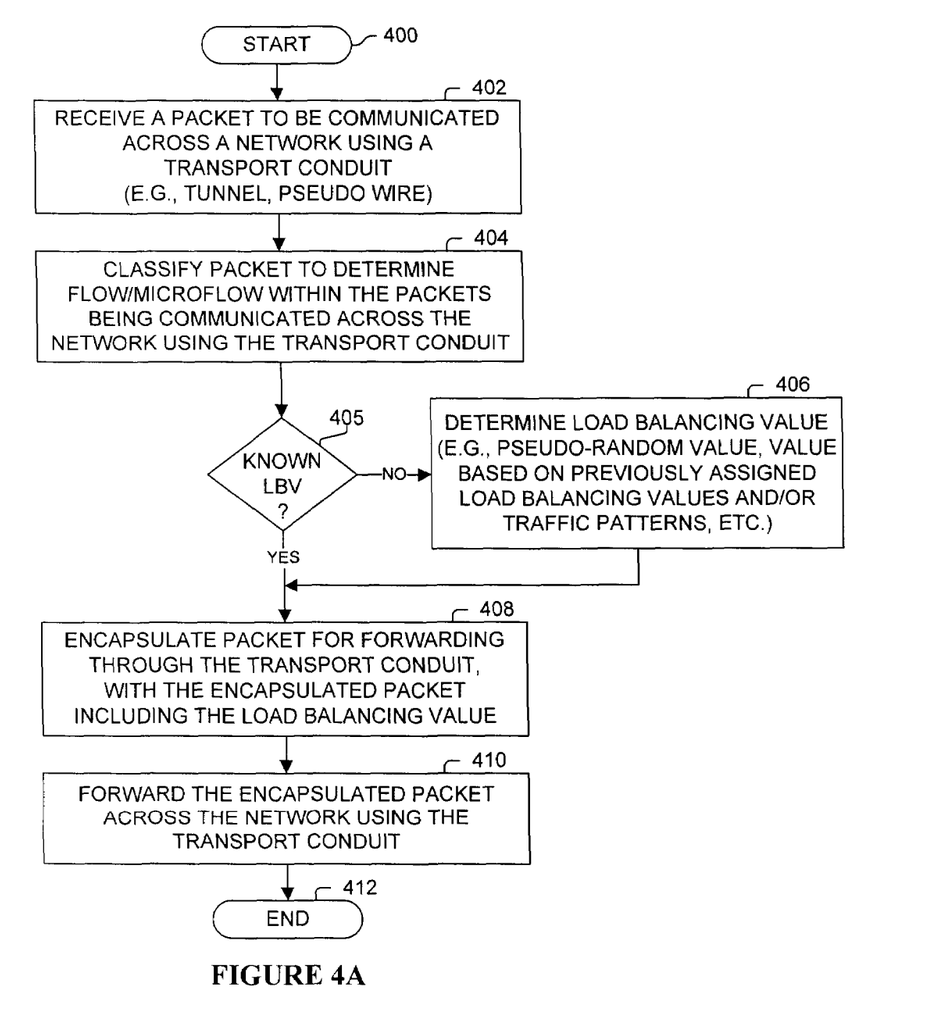
FIG. 4A illustrates a process used in one embodiment.

FIG. 4A illustrates a process used by an edge packet switching device in one embodiment. Processing begins with process block 400. In process block 402, a packet to be communicated across a network using a transport conduit is received. In process block 404, the packet is classified (e.g., using a lookup operation, hash function, etc. on one or more fields of the received packet) to determine a corresponding flow or microflow within the transport conduit to which the packet belongs. As determined in process block 405, if the load balancing value for the corresponding flow or microflow is not known, then in process block 406, a load balancing value is determined.

The load balancing value may be determined by an extensible number of ways. For example, the load balancing value might be a pseudo-random value, a value based on previously assigned values and/or traffic patterns, etc. to perform knowledge-based load balancing). Note, the operation of process block 406 is not performed in one embodiment if a load balancing value has been previously determined for the flow or microflow, as it is desirable that all packets in a same flow/microflow traverse the same path through the network to preserve packet ordering. A table or other data structure stored in memory indexed by a flow/microflow identifier is used in one embodiment to keep track of the correspondingly assigned load balancing values.

In process block 408, the packet is encapsulated for forwarding through the network using the transport conduit, with the encapsulated packet including the determined load balancing value; and in process block 410, the encapsulated packet is forwarded. Processing of the flow diagram is complete as indicated by process block 412.

Figure 4B:
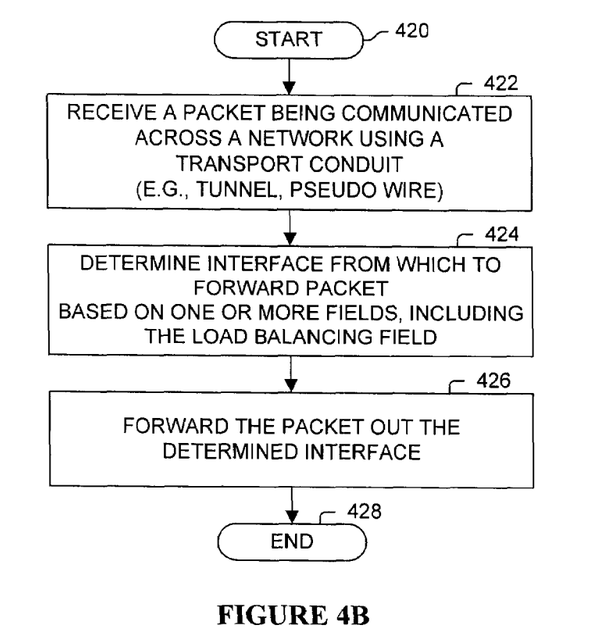
FIG. 4B illustrates a process used in one embodiment.

FIG. 4B illustrates a process used by a midpoint packet switching device in one embodiment. Processing begins with process block 420. In process block 422, an encapsulated packet being communicated using a transport conduit is received. In process block 424, an interface from which to forward the packet is determined based on one or more fields of the packet, including a field containing the load balancing value added to the encapsulated packet (e.g., by an edge packet switching device). In process block 426, the packet is forwarded as determined using the load balancing value. Processing of the flow diagram is complete as indicated by process block 428.

Figure 4C:
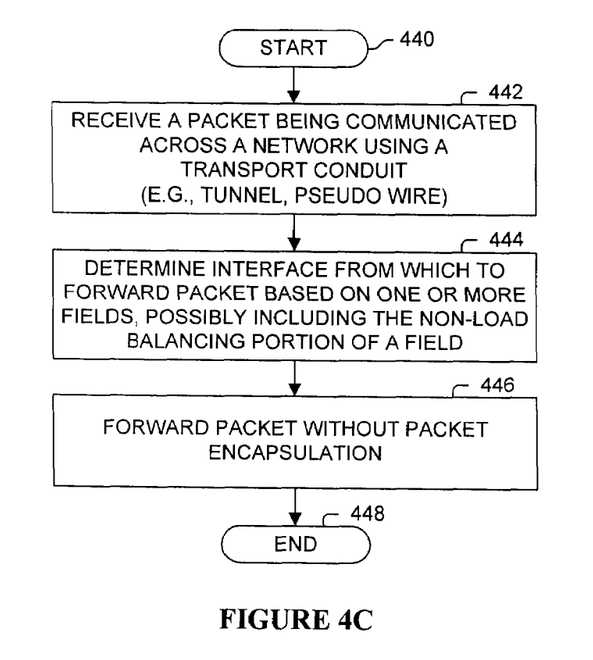
FIG. 4C illustrates a process used in one embodiment.

FIG. 4C illustrates a process used by an edge packet switching device in one embodiment. Processing begins with process block 440. In process block 442, a packet being communicated across a network using a transport conduit is received. In process block 444, the interface from which to forward the packet is determined based on one or more of its fields, possibly including a portion of a field not including the load balancing portion (such as illustrated in FIG. 3B). In process block 446, the packet is accordingly forwarded, typically after stripping of the packet encapsulation (including stripping the load balancing value). Processing of the flow diagram is complete as indicated by process block 448.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
one or more interfaces configured for sending and receiving packets; and one or more processing elements configured to perform operations to forward a packet received by the apparatus, with said operations including:
  determining a transport conduit over which to forward the packet in a network; and
  determining a load balancing value to add entropy to the packet for load balancing operations of the packet performed by one or more downstream packet switching devices in the network providing the transport conduit;
wherein an interface of said interfaces is configured to forward the packet encapsulated for transportation through the transport conduit, with said encapsulated packet including said determined load balancing value for use for only load balancing the packet by at least one of said one or more downstream packet switching devices in the network providing the transport conduit.

2. The apparatus of claim 1, wherein the transport conduit comprises a tunnel; and wherein the load balancing value is selected for load balancing a packet flow to which the packet belongs within the tunnel.

3. The apparatus of claim 2, wherein said load balancing value is inserted in a portion of a session identification field of said encapsulation of the packet.

4. The apparatus of claim 3, wherein a portion of the session identification field not including the load balancing value identifies the session within the tunnel for the packet.

5. The apparatus of claim 2, wherein said tunnel is a generic routing encapsulation (GRE) tunnel, and the load balancing value is included in the Key field.

6. The apparatus of claim 1, wherein the transport conduit comprises a pseudo wire; and wherein the load balancing value is selected for load balancing microflows within the pseudo wire.

7. The apparatus of claim 1, wherein the load balancing value is added to a load balancing field of said encapsulation of the packet.

8. The apparatus of claim 1, wherein the load balancing value is a pseudo-random number.

9. The apparatus of claim 1, wherein the apparatus is configured to insert the load balancing value in a field independent of other functionality in said encapsulation of the packet.

10. The apparatus of claim 1, wherein the apparatus is configured to add the load balancing value in a Multiprotocol Label Switching (MPLS) label in said encapsulation of the packet.

11. The apparatus of claim 10, wherein the apparatus is configured to add the MPLS label to the bottom of a label stack including a plurality of MPLS labels in said encapsulation of the packet.

12. A method performed by a particular packet switching device, the method comprising:
  receiving a packet; and
  in response to said receiving of the packet:
    determining a transport conduit over which to forward the packet to a second packet switching device of one or more downstream packet switching devices providing the transport conduit in a network;
    determining a load balancing value to add entropy to the packet for only load balancing operations of the packet performed by at least one of said one or more downstream packet switching devices in the network providing the transport conduit; and
    forwarding, over said determined transport conduit, the packet including said determined load balancing value.

13. The method of claim 12, wherein the transport conduit is a tunnel; and wherein said operation of determining the load balancing value includes selecting the load balancing value for load balancing a packet flow to which the packet belongs within the tunnel.

14. The method of claim 12, wherein the transport conduit is a pseudo wire; and wherein said operation of determining the load balancing value includes selecting the load balancing value for load balancing microflows within the pseudo wire.

15. The method of claim 12, wherein endpoints of the transport conduit are the particular packet switching device and the second packet switching device.

16. The method of claim 12, wherein the load balancing value is a pseudo-random number.

17. A method for operating a first network edge packet switching device of a network, the first network edge packet switching device performing packet encapsulation for transporting packets through a transport conduit across a network to a second network edge packet switching device, the method comprising:
  for each particular packet flow of a plurality of packet flows being communicated from the first network edge packet switching device to the second network edge packet switching device over the transport conduit:
    for each particular packet of the particular packet flow:
      encapsulating said particular packet according to the protocol of said transport conduit and forwarding said particular packet from the first network edge packet switching device, wherein said encapsulation of said particular packet includes a determined load balancing value to add entropy to said particular packet for load balancing of said particular packet performed by one or more downstream packet switching devices along at least one of a plurality of active paths in the transport conduit;
  wherein the determined load balancing value is the same for all said packets of a same packet flow of the plurality of packet flows, and is different for at least two different packet flows of the plurality of packet flows; and
  wherein the first network edge packet switching device inserts the determined load balancing value in a field independent of other functionality in said transport conduit encapsulation.

18. A method for operating a first network edge packet switching device of a network, the first network edge packet switching device performing packet encapsulation for transporting packets through a transport conduit across a network to a second network edge packet switching device, the method comprising: for each particular packet flow of a plurality of packet flows being communicated from the first network edge packet switching device to the second network edge packet switching device over the transport conduit: for each particular packet of the particular packet flow: encapsulating said particular packet according to the protocol of said transport conduit and forwarding said particular packet from the first network edge packet switching device, wherein said encapsulation of said particular packet includes a determined load balancing value to add entropy to said particular packet for load balancing of said particular packet performed by one or more downstream packet switching devices along at least one of a plurality of active paths in the transport conduit;
  wherein the determined load balancing value is the same for all said packets of a same packet flow of the plurality of packet flows, and is different for at least two different packet flows of the plurality of packet flows; and
  wherein the first network edge packet switching device pushes a Multiprotocol Label Switching (MPLS) label including the determined load balancing value onto the bottom of a label stack including a plurality of MPLS labels in said transport conduit encapsulation.

19. A method for operating a first network edge packet switching device of a network, the first network edge packet switching device performing packet encapsulation for transporting packets through a transport conduit across a network to a second network edge packet switching device, the method comprising:

for each particular packet flow of a plurality of packet flows being communicated from the first network edge packet switching device to the second network edge packet switching device over the transport conduit:
  for each particular packet of the particular packet flow:
    encapsulating said particular packet according to the protocol of said transport conduit and forwarding said particular packet from the first network edge packet switching device, wherein said encapsulation of said particular packet includes a determined load balancing value to add entropy to said particular packet for load balancing of said particular packet performed by one or more downstream packet switching devices along at least one of a plurality of active paths in the transport conduit;

wherein the determined load balancing value is the same for all said packets of a same packet flow of the plurality of packet flows, and is different for at least two different packet flows of the plurality of packet flows; and wherein said load balancing value is inserted in a portion of a session identification field of said transport conduit encapsulation; and wherein the first network edge packet switching device and the second network edge packet switching device use the portion of the session identification field not including the determined load balancing value included in each said packet as the identifier of the session within the transport conduit for each said packet.

20. A method performed in a network, the network including a first network edge packet switching device, a second network edge packet switching device, a midpoint packet switching device, wherein the midpoint packet switching device is communicatively coupled to both the first network edge packet switching device and the second network edge packet switching device including a plurality of paths between the midpoint packet switching device and the second network edge packet switching device, the method comprising:

the first network edge packet switching device creating a load balancing value designed to add entropy in the load balancing of packet traffic in the network, and adding the load balancing value to each particular packet, in a well-defined field designated for only load balancing of said particular packet, of a stream of packets in a packet flow being routed through the midpoint packet switching device and the second network edge packet switching device;

being downstream of the first network edge packet switching device, the midpoint packet switching device for each received packet of the stream of packets in the packet flow determining which particular path of the plurality of paths between the midpoint packet switching device and the second network edge packet switching device based on the load balancing value in said received packet, and sending said received packet of the stream of packets to the second network edge packet switching device over said determined particular path; and being downstream of the midpoint packet switching device, the second network edge packet switching device for each received particular packet of the stream of packets striping the load balancing value from said received particular packet, and forwarding said received particular packet without the load balancing value to another device.

21. The method of claim 20, wherein each packet of the stream of packets in the packet flow is being sent through a transport conduit from the first network edge packet switching device to the second network edge packet switching device, with the first network edge packet switching device adding transport conduit encapsulation to each said packet and the second network edge packet switching device removing said transport conduit encapsulation from each said packet.

22. The apparatus of claim 1, wherein the apparatus is a packet switching device.

* * * * *